(12) United States Patent
Rotole et al.

(10) Patent No.: US 7,140,293 B1
(45) Date of Patent: Nov. 28, 2006

(54) SINGLE ROW TWINE BOX

(75) Inventors: David Vincent Rotole, Ottumwa, IA (US); Stanley Ray Sumsion, Moses Lake, WA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/147,485

(22) Filed: Jun. 8, 2005

(51) Int. Cl.
*B65B 13/18* (2006.01)

(52) U.S. Cl. .................. 100/34; 100/912; 100/33 R; 221/175; 242/146; 206/391

(58) Field of Classification Search .............. 100/5, 100/33 R, 34, 912; 56/132, 133; 221/175–184, 221/67; 211/85.5, 44, 125; 206/389, 391, 206/392; 242/141, 146, 137.1
See application file for complete search history.

(56) References Cited

U.S. PATENT DOCUMENTS 1,731,347 A * 10/1929 Milosewicz ............ 242/137.1
2,075,129 A * 2/1937 Olund ........................ 211/50
2,477,059 A * 7/1949 Hill ........................ 242/137.1
4,530,472 A * 7/1985 Voss et al. ............... 242/588.1
4,586,633 A * 5/1986 Holland et al. ............ 221/257
5,230,282 A * 7/1993 Barnes ........................ 100/34
6,857,251 B1 * 2/2005 McClure et al. ............ 53/587

* cited by examiner

*Primary Examiner*—Lowell A. Larson
*Assistant Examiner*—Jimmy T. Nguyen

(57) ABSTRACT

A twine box is provided for an agricultural baler. The twine box permits ready access to twine balls housed therein because all twine balls are located on a single row or tier. The twine balls are not compartmentalized and thus relocation of twine balls within twine ball groups is facilitated. Twine ball separators are employed to secure, locate and separate twine balls when the baler is operating. The twine ball separators may serve to maintain twine balls in a staggered configuration whereby it is possible to house a greater number of twine balls in a given space. The twine ball separators do not interfere with the movement of twine balls within the twine box during reloading of twine. The single row twine box allows the baler operator to access the twine balls from the ground and permits moving of twine balls without the need to cut and retie twine.

23 Claims, 3 Drawing Sheets

SINGLE ROW TWINE BOX

FIELD OF THE INVENTION

The present invention relates generally to agricultural balers. More particularly, the present invention relates to such balers that form discrete bales of crop material and wherein twine is used for wrapping the bales to maintain bale shape and structural integrity after being formed in the baling chamber. Specifically, the present invention relates to an improved twine box for holding, storing and dispensing twine.

BACKGROUND OF THE INVENTION

Agricultural balers commonly have machine configurations that cause the location of the twine box, usually a double row twine box, to be situated such that access by the operator from the ground is limited, especially the top row of twine balls. This is more apparent on larger size balers, and sometimes requires the operator to stand on an elevated platform such as a truck bed or step ladder to load twine. In order to carry enough twine capacity for larger square balers, manufacturers have previously chosen multiple row twine box designs, partially due to space constraints.

The pattern of the twine ball compartments within the twine box wherein there is generally one compartment for each twine ball, can require the operator to cut and retie the twine if he/she wants to move the twine ball to another twine ball compartment. While this is generally accepted, it is undesirable due to the added likelihood of mis-ties.

Accordingly, there is a clear need in the art for an improved twine box design that provides ready access to the twine balls and that facilitates the relocation of twine balls within the box when reloading twine.

SUMMARY OF THE INVENTION

The single row twine box according to the invention contains all of the twine balls (for one side of the machine) on a single tier or row. By eliminating the top tier from the twine box the operator can more easily access all of the twine balls in the box without the aid of a ladder. In order to house the balls in a single row the twine balls are placed next to each other rather than on top of each other.

By locating all the balls of twine on a single row and by keeping the twine ball compartments open, the twine balls (within a twine ball group) can be moved to another location within the twine ball group, without cutting and retying the twine. This aids the operator in arranging and loading twine. A twine ball group is two or more balls of twine tied together to feed a single twine knotter on the baler. Twine balls can be placed all in a single row or staggered to conserve the overall length of the box.

One of the difficulties of placing the twine balls next to each other on the same level is the need and possible difficulty of accessing the twine balls that are furthest from the operator and behind the other balls of twine (when staggered). The twine balls in this concept are not compartmentalized during service. To allow the operator access to these twine balls, partitions which define the twine ball compartment within the twine box have traditionally been placed on the back wall of the twine box. By eliminating partitions that compartmentalize the twine balls and instead utilizing twine ball separators, the inside of the twine box can be free of structure that impedes the access to the twine balls that are located along the back wall of the twine box.

Twine ball separators mounted on the twine box door engage the balls of twine when closed to ensure the balls are located correctly and do not fall over. These separators disengage from the balls when the door is opened, allowing easy access and relocation of twine balls.

The present invention thus provides easier access to twine balls for loading and unloading as well as flexibility on rearranging twine balls within a specific group. Such a configuration can also be manufactured more compactly and at a lower cost.

In view of the foregoing, it is an object of the invention to provide a twine box for an agricultural baler.

Another object of the invention is the provision of such a twine box that provides ready access to the twine balls without the need for ladders etc.

A further object of the invention is to provide such a twine box that allows twine balls to be relocated within the twine box without the need to cut and retie the twine.

An additional object of the invention is the provision of such a twine box that is compatible with known baler designs and twine delivery systems.

In general, a twine box is provided for an agricultural baler. The twine box permits ready access to twine balls housed therein because all twine balls are located on a single row or tier. The twine balls are not compartmentalized and thus relocation of twine balls within twine ball groups is facilitated. Twine ball separators are employed to secure, locate and separate twine balls when the baler is operating. The twine ball separators may serve to maintain twine balls in a staggered configuration whereby it is possible to house a greater number of twine balls in a given space. The twine ball separators do not interfere with the movement of twine balls within the twine box during reloading of twine. The single row twine box allows the baler operator to access the twine balls from the ground and permits moving of twine balls without the need to cut and retie twine.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
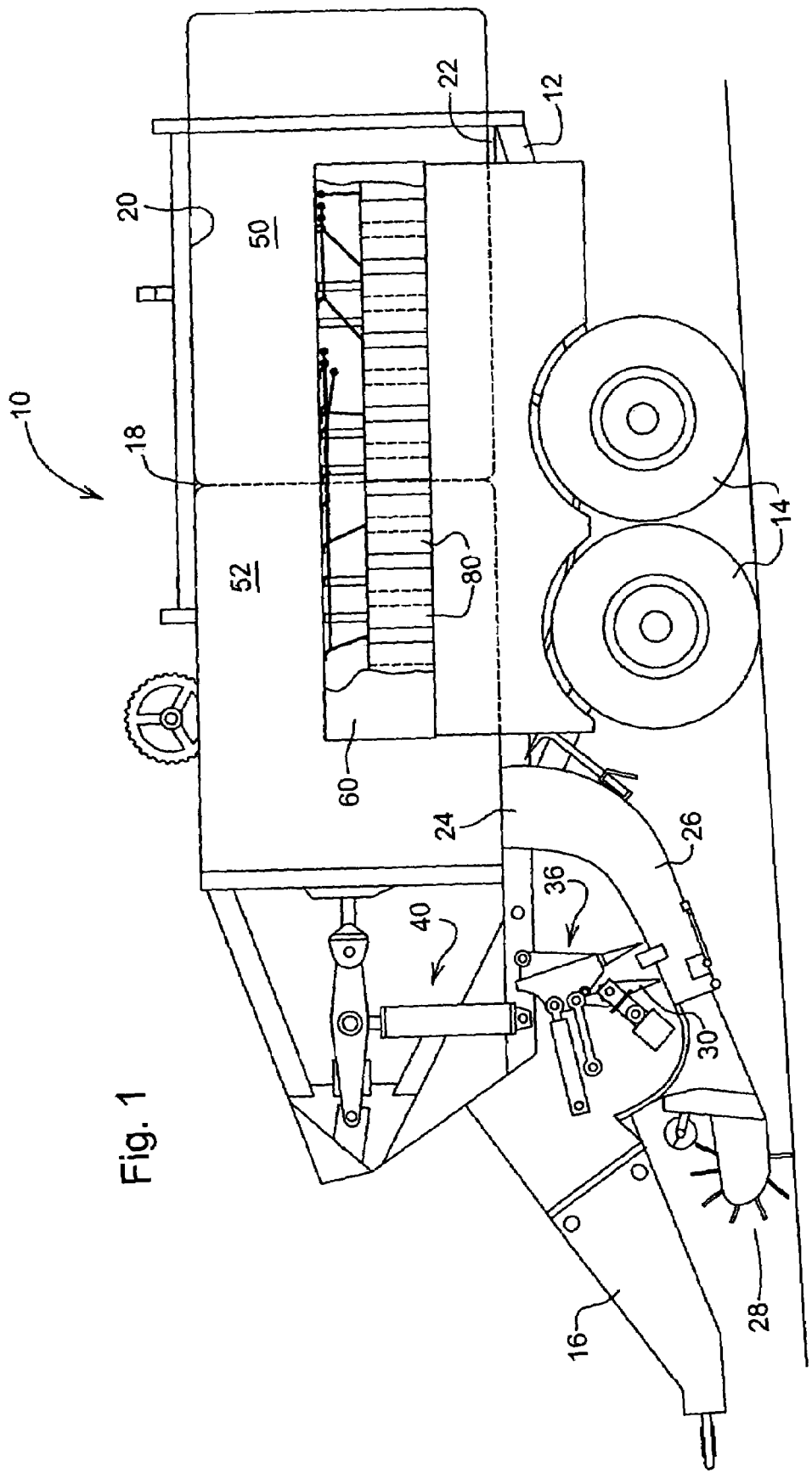
FIG. 1 is a somewhat schematic side elevational view showing a large parallelepiped agricultural baler.

With reference now to the drawings it can be seen that a large parallelepiped agricultural baler is designated generally by the numeral 10. The baler 10 includes a frame 12 supported on a tandem set of ground wheels 14. A tongue 16 is fixed to and extends forwardly from the frame 12 and is adapted for being attached to a prime mover, such as an agricultural tractor (not shown) equipped with a power take-off shaft for supplying power for driving various driven components of the baler. A baling chamber 18 of rectangular cross section is defined in part by upper and lower walls 20 and 22, respectively, with the lower wall 22 being provided with a crop inlet 24 to which is attached a curved in-feed duct 26 which serves as a pre-compression chamber. A crop pick-up and center-feed auger assembly 28 is provided ahead of the duct for picking up a windrow of crop from the ground and delivering it to a packer fork assembly 30 which acts to pack crop into the duct 26 until a charge of a pre-selected density has accumulated, at which time the charge of crop material is stuffed into the baling chamber 18 by a stuffer fork assembly 36. Once the charge of crop material is stuffed into the baling chamber 18, a plunger mechanism 40, which is mounted to a forward location of the frame 12 is operated to move the material rearwardly in the chamber 18 where it is compacted into a column. Upon the column of compressed crop material reaching a pre-selected length, a twine-delivery needle assembly (not shown), including a plurality of curved needles, is actuated to deliver a plurality of strands of twine respectively to a plurality of knotters (not shown) which act to tie lengths of twine about the pre-selected column length to form a bale 50 that is then ready for discharge, which will occur upon it being forced from the rear end of the chamber 18 by a bale portion 52 as it grows in length upon new charges of crop being stuffed into the chamber. Twine is provided to the twine delivery needle assembly and knotters from a supply of twine balls 80 housed in one or more twine boxes 60 mounted on the baler.

Figure 2:
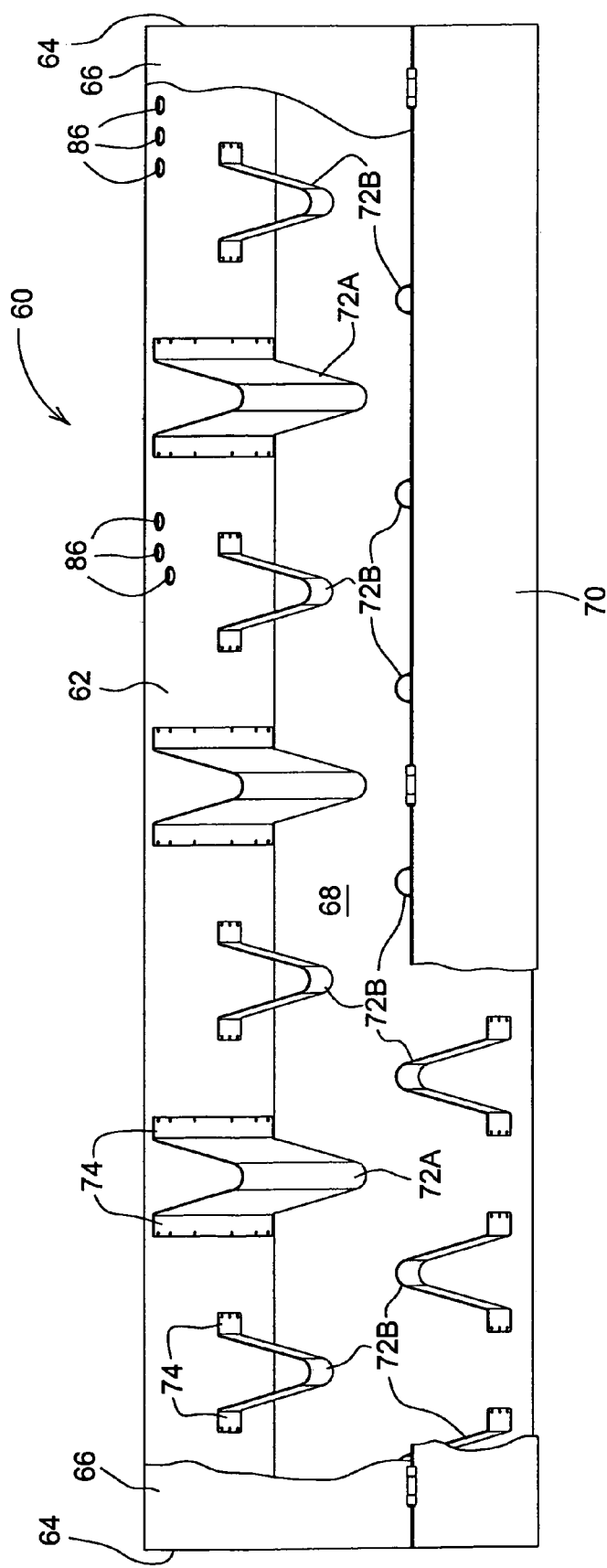
FIG. 2 is a partially cut-away perspective view of a twine box according to the invention; and, FIG. 3 is a top plan view of the twine box according to the invention with a plurality of twine balls disposed therein.
Figure 3:
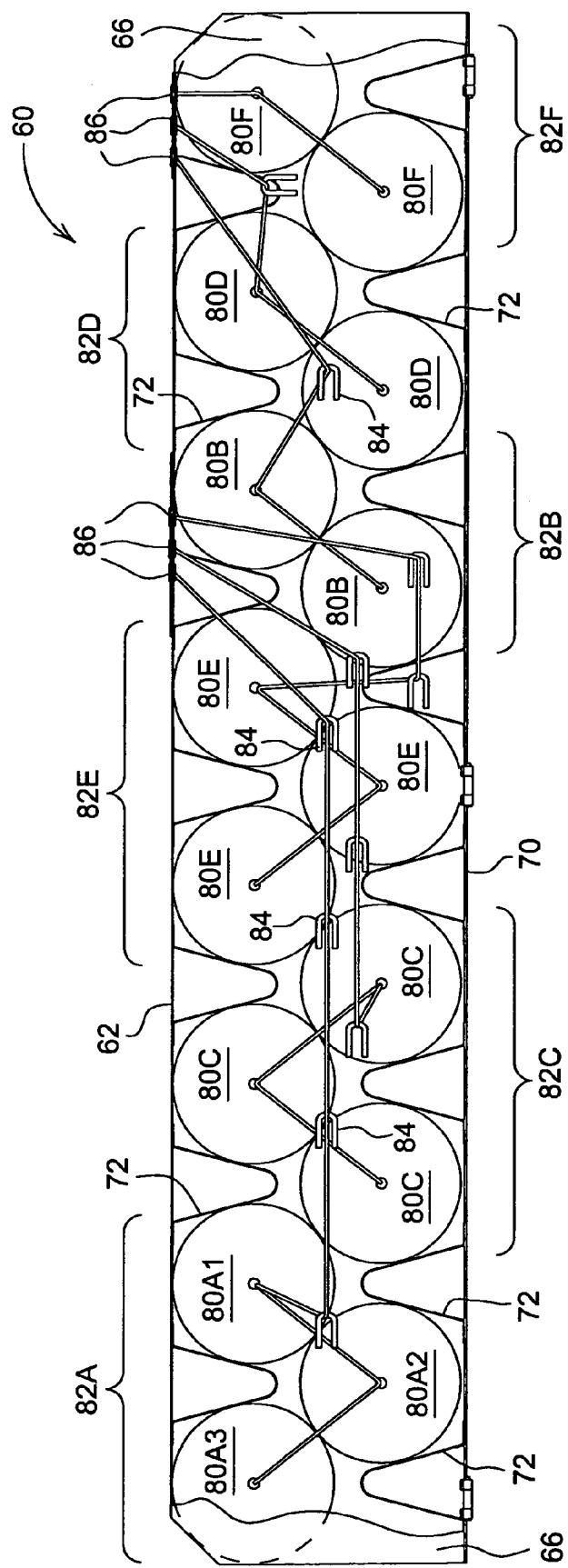

A twine box 60 according to the invention is illustrated in more detail in FIGS. 2 and 3. It should be noted that while a baler 10 employing the invention might have a second twine box located on the other side of the baler, the second twine box is substantially identical in construction to the twine box 60 illustrated and thus is not illustrated separately. As shown, the twine box 60 is comprised generally of a first or rear wall 62, a pair of opposed end walls 64, an upper wall 66, a lower wall 68 opposing the upper wall 66, and a hinged access door 70 which forms a second or front wall that opposes the first or rear wall 62 when closed. As can be seen, the twine box 60 may further include one or more twine ball separators 72 attached to the first or rear wall 62. Two types of twine ball separators 72 are illustrated. Both separator types have a generally vee-shaped cross-section and each include a pair of mounting flanges 74. The first type of twine ball separator 72A is substantially the same height as the first or rear wall 62 and serves to separate adjacent twine balls. In the preferred embodiment illustrated the twine box 60 includes three twine ball separators 72A. The second type of twine ball separator 72B is substantially smaller in height than the separators 72A and also serves to separate and secure a pair of adjacent twine balls. In the preferred embodiment illustrated there are four separators 72B, one on either side of each separator 72A. A plurality of separators 72B are similarly provided on the hinged access door 70 to further separate, locate and secure the twine balls when the access door 70 is closed.

Referring now to FIG. 3 it can be seen that the twine box 60 is illustrated with a plurality of twine balls 80 loaded therein. FIG. 3 further illustrates how the separators 72 cooperate with one another when the hinged access door 70 is closed so as to separate, locate and secure the twine balls 80 during baler operation without the need for dividers that compartmentalize the twine balls as in previously known designs. It will also be seen that the separators 72 facilitate a staggered arrangement of twine balls 80 within the twine box 60 so as to permit loading of a substantial number of twine balls 80 while utilizing the smallest space possible. Those having skill in the art will recognize that the concept of the invention is applicable to twine boxes wherein the twine balls are positioned in a straight line (non-staggered). In the preferred embodiment described herein the twine box 60 is one of two twine boxes mounted on either side of the baler—each of the two twine boxes feeding half of the knotters of the baler. In the particular embodiment shown each twine box feeds three of a total of six knotters. For purposes of discussion the knotters fed by the twine box 60 illustrated will be referred to as knotters one, two, and three, it being understood that knotters four, five and six are fed by a substantially identical twine box located on the other side of the baler. For purposes of understanding the invention, it should also be noted that each knotter is fed two independent strands of twine. Accordingly, each knotter is associated with two separate twine ball groups 82. As illustrated, the three twine balls designated 80A form a first twine ball group 82A feeding knotter one, while the two twine balls designated 80B form a second twine ball group 82B also feeding knotter one. Likewise the three twine balls designated 80C form a first twine ball group 82C feeding knotter two, while the twine balls designated 80D form a second twine ball group 82D also feeding knotter two. Finally, the three twine balls designated 80E form a first twine ball group 82E feeding knotter three, while the two twine balls 80F form a second twine ball group 82F also feeding knotter three. It should be understood that a first end of the strand of twine comprising the first twine ball (e.g. 80A1) of each twine ball group 82 is threaded through one or more twine guides 84 mounted to the upper wall 66 of the twine box 60, through twine guide apertures 86 in the rear wall 62 of the twine box 60 and ultimately routed to the knotters (not shown). The first or leading end of the remaining twine balls 80 in each twine ball group 82 is tied to the second or tail end of the adjacent twine ball 80 within the twine ball group 82. For example, the leading end of twine ball 80A1 (occupying the number one position within the group 82A) is routed to the knotter via the twine guides 84 and the twine guide apertures 86 while its tail end is tied to the leading end of the twine ball 80A2 (occupying the number two position within the group 82A). The tail end of twine ball 80A2 is likewise tied to the leading end of twine ball 80A3 (occupying the number three position within the group 82A). Thus, as the baling process proceeds twine is paid out to knotter one, first from twine ball 80A1 until the ball is depleted, at which time twine is then paid out to knotter one from twine ball 80A2 and then from twine ball 80A3. A similar arrangement is used for each twine ball group 82 in the twine box 60. Thus it can be seen that it is advantageous to have the ability to readily move twine balls 80 from one twine ball group location or position within the twine box 60 to another. More particularly, when the baler operator stops to reload the twine boxes it is likely that one or more of the twine balls 80 within each twine ball group 82 will have already been completely depleted, possibly leaving less than a complete twine ball 80 from each twine ball group 82. Therefore it is advantageous for the operator to be able to move the remaining (partial) twine ball 80 to the number one position from the number two or three position and tie the newly loaded twine balls together and to the remaining (partial) twine ball as described above. With previously known two tier twine box designs this was difficult, as moving a twine ball from one tier to another involved cutting, retying and possibly rethreading the twine. Further, previously known single tier twine boxes have dividers which isolate the twine balls from one another and typically include twine routing apertures in the dividers which complicate the process of moving a twine ball from one compartment to another. Because the twine box 60 of the invention locates all twine balls on a single tier or row and further because there are no dividers isolating the twine balls from one another it is possible to simply move twine balls from one location to another within the twine ball group without the need to cut, rethread and/or retie the twine. The twine ball separators of the invention facilitate the staggered orientation of twine balls on a single row or tier while not requiring substantially more space than that of previously known designs. Because of the single tier design, access to the twine balls is greatly improved as the baler operator can readily access all twine balls while standing on the ground beside the baler.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A twine storage and dispensing box for an agricultural baler having:
   a rear wall having a plurality of twine guide apertures;
   a hinged access door forming a second wall opposing the first wall when the door is closed;
   an upper wall having twine guides attached thereto;
   a plurality of twine ball separators attached to the hinged access door and the rear wall;
   the twine ball separators cooperating to maintain, without compartmentalizing, a plurality of twine balls in a single row or tier between the first and second walls, wherein each of the twine balls is a member of a twine ball group defined by a connection to a particular knotter mechanism on the baler and each of the twine balls occupies a particular position within the twine ball group;
   the twine box being so configured such that one of the twine balls can be moved from one location within the twine ball group to another location within the same twine ball group without the need to cut and retie the twine.

2. A twine storage and dispensing box for an agricultural baler as set forth in claim 1 wherein the twine balls are arranged in the twine box in a straight line.

3. A twine storage and dispensing box for an agricultural baler as set forth in claim 1 wherein the twine balls are arranged in the twine box in a staggered configuration.

4. A twine storage and dispensing box for an agricultural baler as set forth in claim 1 further comprising a pair of opposed end walls.

5. A twine storage and dispensing box for an agricultural baler as set forth in claim 1 wherein the separators have a generally vee-shaped cross-section.

6. A twine storage and dispensing box for an agricultural baler as set forth in claim 1 wherein the twine box is mounted on the baler such that all of the twine balls can be accessed by a baler operator while the baler operator is standing on the ground.

7. A twine storage and dispensing box for an agricultural baler as set forth in claim 1 wherein the separators attached to the door engage the twine balls when the door is closed and disengage the twine balls when the door is opened.

8. A twine storage and dispensing box for an agricultural baler as set forth in claim 1 wherein the twine balls from the twine ball group are tied together to form a continuous strand of twine to be fed to the knotter mechanism.

9. A twine storage and dispensing box for an agricultural baler as set forth in claim 8 wherein the strand of twine is routed through the twine guides and twine guide apertures.

10. A twine storage and dispensing box for an agricultural baler as set forth in claim 1 wherein the twine ball group has a first twine ball and a second twine ball, a leading end of a strand of twine comprising the first twine ball being routed to the knotter mechanism, a leading end of a strand of twine comprising a second twine ball being tied to a tail end of the strand of twine comprising the first twine ball such that when the first twine ball is depleted of twine, twine is then fed to the knotter mechanism from the second twine ball, the first twine ball occupying a first position within the twine ball group and the second twine ball occupying a second position within the twine ball group wherein the second twine ball can be moved from the second position to the first position without cutting and retying the twine when it is necessary to load additional twine balls in the twine box.

11. A twine storage and dispensing box for an agricultural baler as set forth in claim 10 wherein the twine ball group further has a third twine ball, a leading end of a strand of twine comprising the third twine ball being tied to a tail end of the strand of twine comprising the second twine ball such that when the second twine ball is depleted of twine, twine is fed to the knotter mechanism from the third twine ball, the third twine ball occupying a third position within the twine ball group, wherein the third twine ball can be moved from the third position to the first or second positions without cutting and retying the twine when it is necessary to load additional twine balls in the twine box.

12. An agricultural baler for forming crop material into bales, wherein the bales are wrapped with twine to maintain bale shape and structural integrity after the bale is formed in a baling chamber, the baler comprising:
   at least one knotter mechanism for securing the twine after it is wrapped around the bale;
   a twine delivery system for delivering twine to the at least one knotter mechanism; and, a twine storage and dispensing box from which twine is dispensed to the twine delivery system and the knotter mechanism, the twine storage and dispensing box comprising:

a rear wall having a plurality of twine guide apertures;

a hinged access door forming a second wall opposing the first wall when the door is closed;

an upper wall having twine guides attached thereto;

a plurality of twine ball separators attached to the hinged access door and the rear wall;

the twine ball separators cooperating to maintain, without compartmentalizing, a plurality of twine balls in a single row or tier between the first and second walls, wherein each of the twine balls is a member of a twine ball group defined by a connection to a particular knotter mechanism on the baler and each of the twine balls occupies a particular position within the twine ball group;

the twine box being so configured such that one of the twine balls can be moved from one location within the twine ball group to another location within the same twine ball group without the need to cut and retie the twine.

13. An agricultural baler as set forth in claim 12 wherein the twine balls are arranged in the twine box in a straight line.

14. An agricultural baler as set forth in claim 12 wherein the twine balls are arranged in the twine box in a staggered configuration.

15. An agricultural baler as set forth in claim 12 further comprising a pair of opposed end walls.

16. An agricultural baler as set forth in claim 12 wherein the separators have a generally vee-shaped cross-section.

17. An agricultural baler as set forth in claim 12 wherein the twine box is mounted on the baler such that all of the twine balls can be accessed by a baler operator while the baler operator is standing on the ground.

18. An agricultural baler as set forth in claim 12 wherein the separators attached to the door engage the twine balls when the door is closed and disengage the twine balls when the door is opened.

19. An agricultural baler as set forth in claim 12 wherein the baler is a large parallelepiped baler.

20. An agricultural baler as set forth in claim 12 wherein the twine balls from the twine ball group are tied together to form a continuous strand of twine to be fed to the knotter mechanism.

21. An agricultural baler as set forth in claim 20 wherein the strand of twine is routed through the twine guides and twine guide apertures.

22. An agricultural baler as set forth in claim 12 wherein the twine ball group has a first twine ball and a second twine ball, a leading end of a strand of twine comprising the first twine ball being routed to the knotter mechanism, a leading end of a strand of twine comprising a second twine ball being tied to a tail end of the strand of twine comprising the first twine ball such that when the first twine ball is depleted of twine, twine is fed to the knotter mechanism from the second twine ball, the first twine ball occupying a first position within the twine ball group and the second twine ball occupying a second position within the twine ball group, wherein the second twine ball can be moved from the second position to the first position without cutting and retying the twine when it is necessary to load additional twine balls in the twine box.

23. An agricultural baler as set forth in claim 22 wherein the twine ball group further has a third twine ball, a leading end of a strand of twine comprising the third twine ball being tied to a tail end of the strand of twine comprising the second twine ball such that when the second twine ball is depleted of twine, twine is fed to the knotter mechanism from the third twine ball, the third twine ball occupying a third position within the twine ball group, wherein the third twine ball can be moved from the third position to the first or second positions without cutting and retying the twine when it is necessary to load additional twine balls in the twine box.

* * * * *